United States Patent [19]

Kim

[11] Patent Number: 5,521,918
[45] Date of Patent: May 28, 1996

[54] ADAPTIVE BIT STREAM DEMULTIPLEXING APPARATUS IN A DECODING SYSTEM

[75] Inventor: Keun-Hwan Kim, Seoul, Rep. of Korea

[73] Assignee: Daewoo Electronics Co., Ltd., Seoul, Rep. of Korea

[21] Appl. No.: 367,361

[22] Filed: Dec. 30, 1994

[30] Foreign Application Priority Data

Jan. 18, 1994 [KR] Rep. of Korea .......................... 94-768

[51] Int. Cl.⁶ .................................................. H04Q 11/04
[52] U.S. Cl. .............................. 370/61; 370/112; 348/423
[58] Field of Search ........................ 370/17, 58.2, 58.3, 370/61, 79, 94.1, 112; 348/552, 714, 719, 423, 17, 388, 387, 462; 340/825.08, 825.15

[56] References Cited

U.S. PATENT DOCUMENTS

| | | | |
|---|---|---|---|
| 4,903,126 | 2/1990 | Kassatly | 370/112 |
| 5,202,886 | 4/1993 | Rossi et al. | 370/112 |
| 5,396,497 | 3/1995 | Veltman | 370/112 |

*Primary Examiner*—Alpus H. Hsu
*Assistant Examiner*—Ricky Q. Ngo
*Attorney, Agent, or Firm*—Anderson Kill Olick & Oshinsky

[57] ABSTRACT

An apparatus for adaptively demultiplexing an input bit stream for use in a decoding system includes a buffer module having a plurality of buffers for temporarily storing the bit stream, a flag state detector for detecting the number of the buffers that exhibits the full state or the empty state and a buffer module controller for adaptively controlling the overflow or the underflow of the buffers, based on the information from the flag state detector.

3 Claims, 4 Drawing Sheets

ADAPTIVE BIT STREAM DEMULTIPLEXING APPARATUS IN A DECODING SYSTEM

FIELD OF THE INVENTION

The present invention relates to a demultiplexer for use in a decoding system; and, more particularly, to an apparatus for adaptively demultiplexing an input bit stream in accordance with the full or empty level of a buffer memory for storing the bit stream.

DESCRIPTION OF THE PRIOR ART

In various electronic/electrical applications such as high definition television and video telephone systems, an image signal may need be transmitted in a digitized form. When the image signal is expressed in the digitized form, there is bound to occur a substantial amount of digital data. Since, however, the available frequency bandwidth of a conventional transmission channel is limited, in order to transmit the image signal therethrough, the use of an image encoding apparatus often becomes necessary to compress the substantial amount of digital data.

Accordingly, most image signal encoding apparatus of the prior art employ various compression techniques (or coding methods) built on the idea of utilizing or reducing spatial and/or temporal redundancies inherent in the input image signal to produce an encoded image signal to form an encoded bit stream with multiplexed video and audio streams.

The encoded bit stream is transmitted through a conventional transmission channel to a decoding system which performs an inverse process of the encoding operation to thereby reconstruct the original image signal. As one example of the decoding system, MPEG-I (motion picture expert group-I) suggests a prototype image signal decoding system model which is provided with a demultiplexer required to separately reconstitute video and audio stream from the multiplexed bit stream.

While MPEG specifies various requirements for a decoding system so as to ensure that it decodes the bit stream in accordance with the MPEG standard, it does not specify the concrete architecture or implementation mode of the decoding system.

SUMMARY OF THE INVENTION

It is, therefore, an object of the invention to provide a practical implementation mechanism for a decoding system which is capable of satisfying the MPEG standard.

It is another object of the invention to provide an adaptive bit stream demultiplexing apparatus for use in such a system.

In accordance with the present invention, there is provided an apparatus for adaptively demultiplexing an input bit stream for use in a decoding system having a decoder for decoding the bit stream to produce a moving picture and its associated sound, the input bit stream representing a video data bit stream for the moving picture and an audio data bit stream for the sound, which comprises: an input FIFO (first-in-first-out) buffer module having a plurality of input FIFO buffer memories in series for temporarily storing the bit stream, each of the input FIFO buffers generating a storage status signal including a full flag or an empty flag signal representative of the full or the empty state thereof, respectively; a video FIFO buffer module having a plurality of video FIFO buffer memories in series for temporarily storing the video data bit stream, each of the video FIFO buffers generating a storage status signal including a full flag or an empty flag signal representative of the full or the empty state thereof, respectively; an audio FIFO buffer module having a plurality of audio FIFO buffer memories in series for temporarily storing the audio data bit stream, each of the audio FIFO buffers generating a storage status signal including a full flag or an empty flag signal representative of the full or the empty state thereof, respectively; a flag status detection means for receiving the full or the empty flag signals from the input, the video and the audio FIFO buffer modules and detecting the full or the empty states of the input FIFO buffers, the video FIFO buffers and the audio FIFO buffers to produce a buffer status detection signal indicative of the number of the FIFO buffers that exhibit the full or the empty state in the input, the video or the audio FIFO buffer module; and a buffer module controller, in response to the buffer status detection signal, for adaptively fetching the input bit stream from the input FIFO buffers that exhibit the full state to demultiplex the fetched bit stream to produce the video and the audio data bit streams and providing the video and the audio data bit streams to the video and the audio FIFO buffers that indicate the empty state, respectively.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
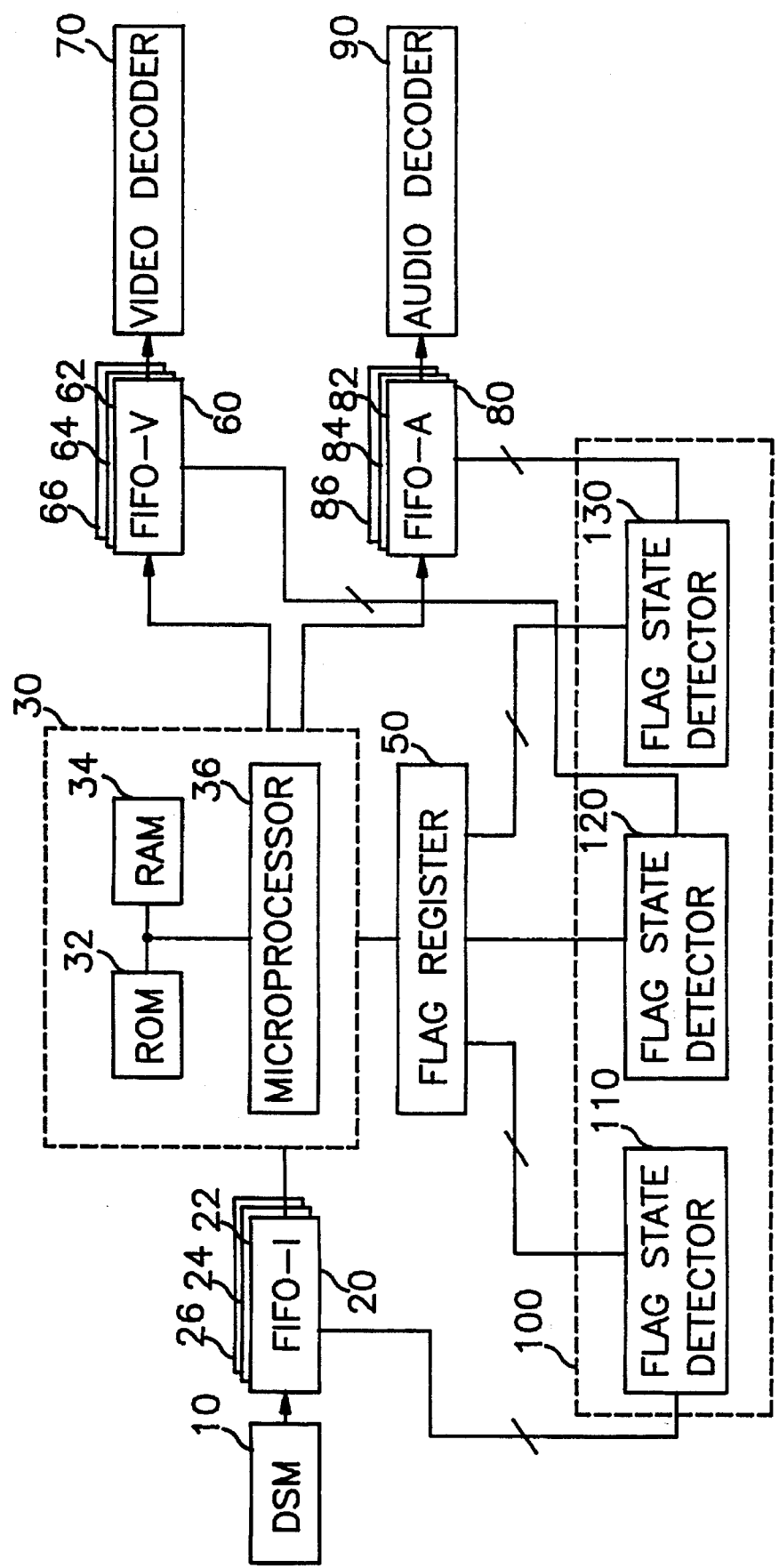
FIG. 1 shows a schematic block diagram of a decoding system in accordance with the invention.

Referring to FIG. 1, there is shown a block diagram of a decoding system having an apparatus for adaptively demultiplexing an encoded data bit stream representing an image signal and a sound signal in accordance with the present invention.

The encoded bit stream is provided from a corresponding conventional encoding system (not shown) to the decoding system, in particular, to a DSM (Digital Storage Media) 10. The encoded bit stream is comprised of packets which are serialized. A packet includes a multiplexed coded representation of one or more audio and/or video stream and a packet header which is used to discriminate between the video and the audio streams. The bit stream is sequentially stored in the DSM 10 on a packet-by-packet basis. The DSM 10 receives the bit stream and supplies it at a fixed rate to an input FIFO (first-in-first-out) ("hereinafter referred to as a FIFO-I") buffer module 20.

The bit stream stored in the FIFO-I buffer module 20 is demultiplexed in accordance with the packet header therein to produce a video and an audio data bit streams under the control of a buffer module controller 30. The demultiplexed video and audio data bit streams are transmitted to a video FIFO (hereinafter referred to as a "FIFO-V") buffer module 60 and an audio FIFO (hereinafter referred to as a "FIFO-A") buffer module 80, respectively. And then, the video and the audio bit streams in the FIFO-V and the FIFO-A buffer modules 60 and 80 are transmitted to a video decoder 70 and an audio decoder for performing conventional decoding processes thereof to produce the image signal and the sound signal, respectively.

The FIFO-I buffer module 20 comprises N number of, e.g., three, FIFO-I buffer memories 22, 24, 26 in series for sequentially receiving the output from the DSM 10. Each of the FIFO-I buffers 22, 24, 26 generates such a buffer status signal as a full-flag signal "FF" of a logic zero ("0") indicating that the buffer is full. Each of the buffer status signals generated from the FIFO-I buffers 22, 24, 26 is provided to a flag state detection block 100.

Likewise, each of the FIFO-V buffer module 60 and the FIFO-A buffer module 80 comprises N number of, e.g., three FIFO-V buffer memories 62, 64, 66 and FIFO-A buffer memories 82, 84, 86 in series for sequentially receiving the video data bit stream and the audio data bit stream from the FIFO-I 20, respectively. Each of the FIFO-V and FIFO-A buffers 62, 64, 66; 82, 84, 86 generates a buffer status signal, e.g., as an empty-flag signal "EF" of a logic one ("1"), indicative of the buffer being empty. Each of the buffer status signals generated from the FIFO-V and FIFO-A buffer modules 60 and 80 is provided to the flag state detection block 100.

In accordance with the invention, the storage capacity of the buffers in the FIFO modules 20, 60 and 80 is designed to store data corresponding to one packet of the input data bit stream.

Figure 2:
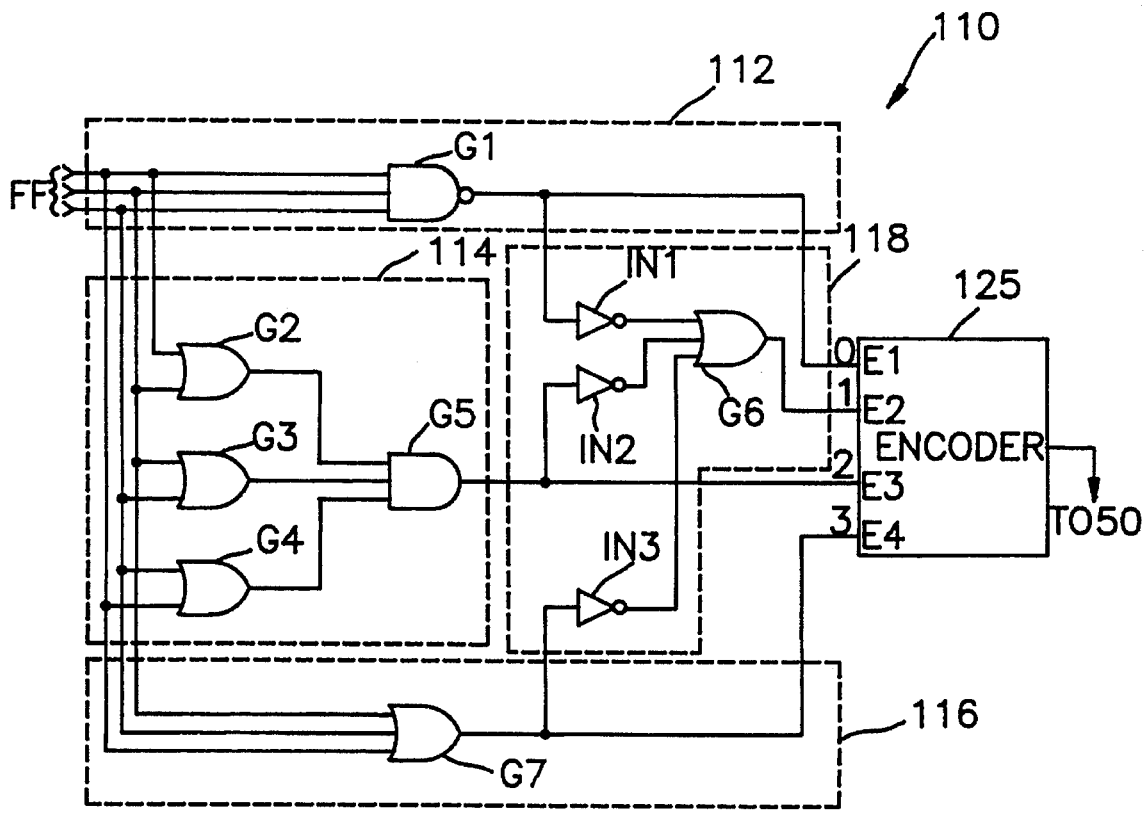
FIG. 2 illustrates a detailed logic circuit diagram of the buffer level detector shown in FIG. 1.

The flag state detection block 100 is comprised of a same set of three substantially identical flag state detectors 110, 120 and 130 for detecting the buffer status of the FIFO-I buffer module 20, the FIFO-V buffer module 60 and the FIFO-A buffer module 80, respectively; and only one of them, i.e., the flag state detector 110, is specifically illustrated in FIG. 2.

As shown in FIG. 2, the flag state detector 110 includes a logic circuit having four logic parts 112, 114, 116 and 118 for detecting the buffer-full status of the three FIFO-I buffers 22, 24 and 26 and a 4-to-2 encoder 125.

A first logic part 112 has a NAND gate G1 for receiving FF signals from the three FIFO-I buffers 22, 24, 26. The first logic part 112 serves to detect the condition that none of the three FIFO-I buffers 22, 24, 26 is in the full state. As the condition is detected, the NAND gate G1 produces as its output a logic zero ("0"), which is sent to an input terminal E1 of the encoder 125.

A second logic part 114 has a set of OR gates G2, G3 and G4 for receiving two outputs from the three FIFO-I buffers 22, 24, 26, respectively and an AND gate G5 for receiving the outputs from the OR gates G2, G3 and G4. The second logic part 114 serves to detect the condition that only two among the three FIFO-I buffers 22, 24, 26 exhibit the full state. As the condition is satisfied, the AND gate G5 issues a logic zero to an input terminal E3 of the encoder 125.

A third logic part 116 has an OR gate G7 for receiving the outputs from the three FIFO-I buffers 22, 24, 26 and functions to detect the condition that all of the three FIFO-I buffers 22, 24, 26 are in the full state. If the condition is satisfied, the OR gate G7 provides a logic zero to an input terminal E4 of the encoder 125.

Lastly, a fourth logic part 118 has a set of three INVERTER gates IN1, IN2 and IN3 for receiving the resultant outputs from the NAND gate G1, the OR gate G5 and the OR gate G7 in the first, the second and the third logic parts 112, 114 and 116, respectively and an OR gate G6 for receiving the resultant outputs from each of the INVERTER gates IN1, IN2 and IN3. The fourth logic part 118 serves to detect the condition that only one of the three FIFO-I buffers 22, 24, 26 is in the full state. As the condition is detected, the OR gate G6 issues a logic zero to an input terminal E2 of the encoder 125.

The encoder 125, in response to the resultant output from the logic circuit, generates as its output a binary code C0 and C1 for the four input variables. That is, the encoder 125 generates the binary code 00, 01, 10, 11 corresponding to the outputs from the four logic parts 112, 114, 116 and 118. The relationship between the outputs of the logic circuit and the encoder 125 is illustrated in TABLE I as follows. As illustrated in TABLE I, the number listed in the right side thereof exhibits the number of the FIFO-I buffer memories that have the full-flag state in the FIFO-I buffer module 20 and the binary code listed in the left side thereof represents the output of the encoder 125. Each of the binary codes is provided to a flag register 50 shown in FIG. 1.

TABLE I

| Binary code (C0 C1) | Number of buffers in the full state |
| --- | --- |
| 0 0 | 0 |
| 0 1 | 1 |
| 1 0 | 2 |
| 1 1 | 3 |

Likewise, each of the flag state detectors 120 and 130 for the FIFO-V buffer module 60 and FIFO-A buffer module 80 has the same configuration as that of the FIFO-I buffer module 20, except that the inputs to the flag state detectors 120 and 130 are the EF signals representing the empty state of the FIFO-V buffers 62, 64, 66 and FIFO-A buffers 82, 84, 86 and the resultant outputs from the first to fourth logic parts (not shown) of the flag state detectors 120 and 130 represent the number of the FIFO-V buffers 62, 64, 66 and the FIFO-A buffers 82, 84, 86 that exhibit the empty state instead of the full state, respectively. Each of the binary codes B1, B0 and A1, A0 generated from the flag state detectors 120 and 130 is also provided to the flag register 50.

Figure 3:
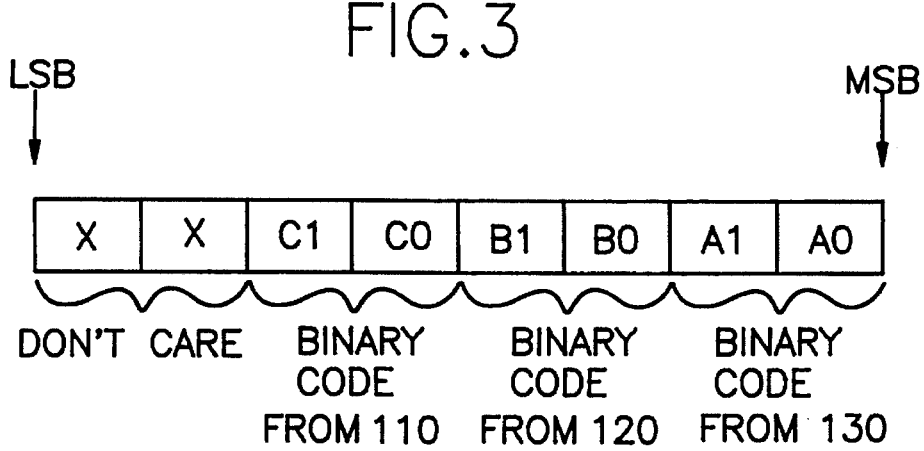
FIG. 3 depicts a bit allocation of the binary code of the flag register shown in FIG. 1.

FIG. 3 represents an exemplary bit allocation of the binary codes A0, A1; B0, B1; and C0, C1 provided from the flag state detection block 100 to the flag register 50. As shown, each of the binary codes A0, A1; B0, B1; and C0, C1 generated from the flag state detectors 130, 120 and 110 is sequentially allocated at the most-significant-bit (MSB) position running from the rightmost bit position. The remaining two bit position at the leftmost position referred to as a least significant bit (LSB) represents "don't care" condition.

Referring back to FIG. 1, the buffer module controller 30 is shown to comprise a microprocessor 36 and a memory unit such as a ROM (read only memory) 32 and a RAM (random access memory) 34. The microprocessor 36 is provided with one input port (not shown) to check the binary bits on the flag register 50 which is interpreted as an external input device thereof. The microprocessor 36 controls the transmission between the FIFO-I buffer module 20 and the FIFO-V and the FIFO-A buffer modules 60 and 80, depending on the number of the FIFO buffers which indicate the full or the empty state as will be discussed hereinafter. The ROM 32 stores instructions and data which are executed by the microprocessor 36 as will be illustrated in FIG. 4. The RAM 34 is defined to have a video queue and an audio queue reserved for the temporary storage and retrieval of the demultiplexed video and audio data bit stream wherein each of the video and the audio queues has two pointers which indicate the top and the bottom of the queues, respectively.

The buffer module controller 30 controls the FIFO-I buffer module 20 to adaptively prevent the occurrence of an overflow of the FIFO-I buffer modules 20 based on the bit state of the flag register 50 in such a manner that the data packet fully filled in the FIFO-I buffer 22, 24 or 26 within the FIFO-I buffer module 20 exhibiting the full state, removes therefrom. Similarly, in order to prevent the occurrence of an underflow of the FIFO-V and the FIFO-A buffer modules 60 and 80, the buffer module controller 30 provides the video and the audio bit streams to the FIFO-V and the FIFO-A buffers that exhibit the empty states, respectively. This buffer module controller 30 may be implemented with a general purpose microcomputer, e.g., 6800 series manufactured by and available from Motorola, Inc. The detailed operation of the buffer module controller 30 will now be explained with reference to FIG. 4.

Figure 4A:
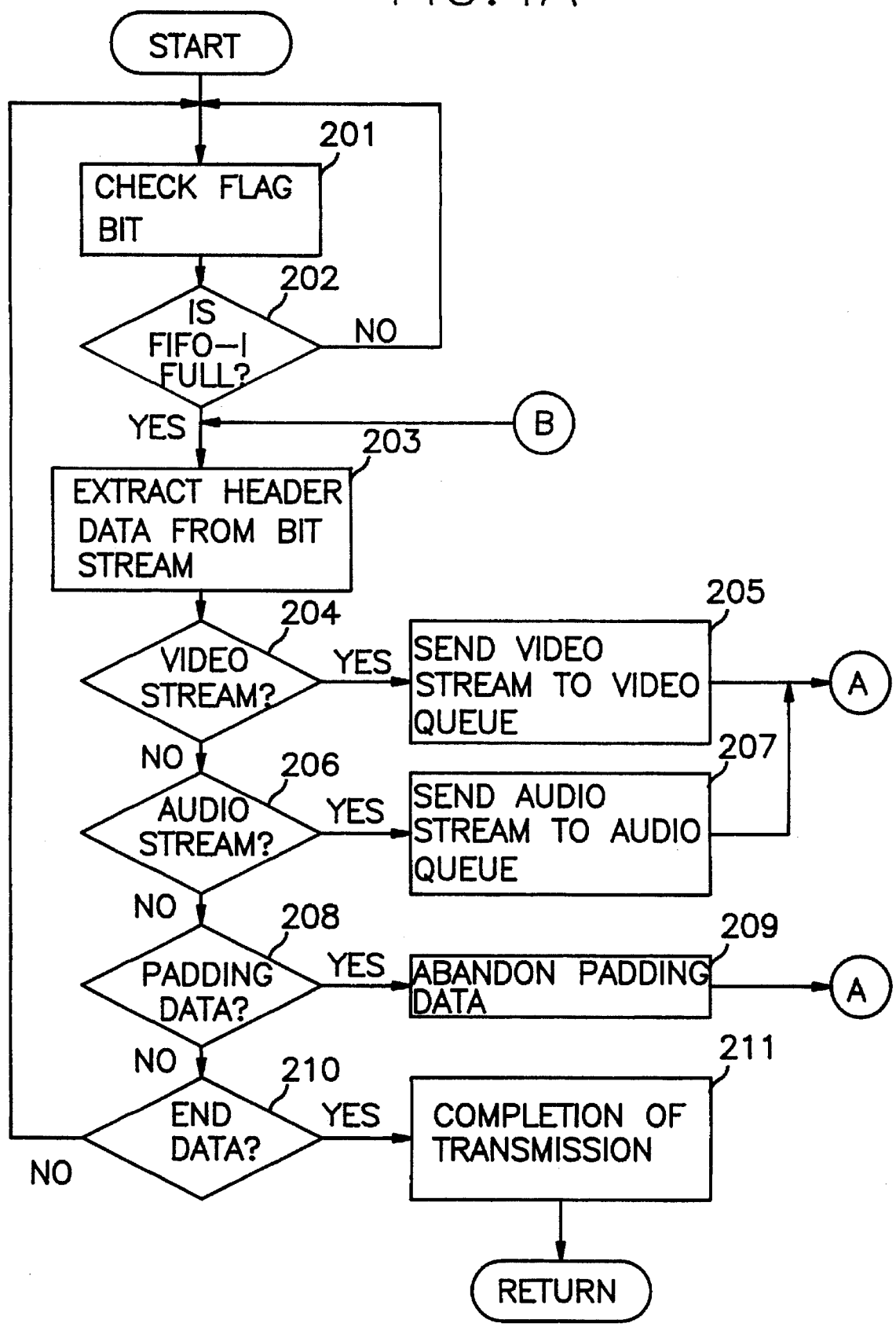
FIGS. 4A & 4B represent a flow diagram explaining the control process performed by the decoding system shown in FIG. 1.
Figure 4B:
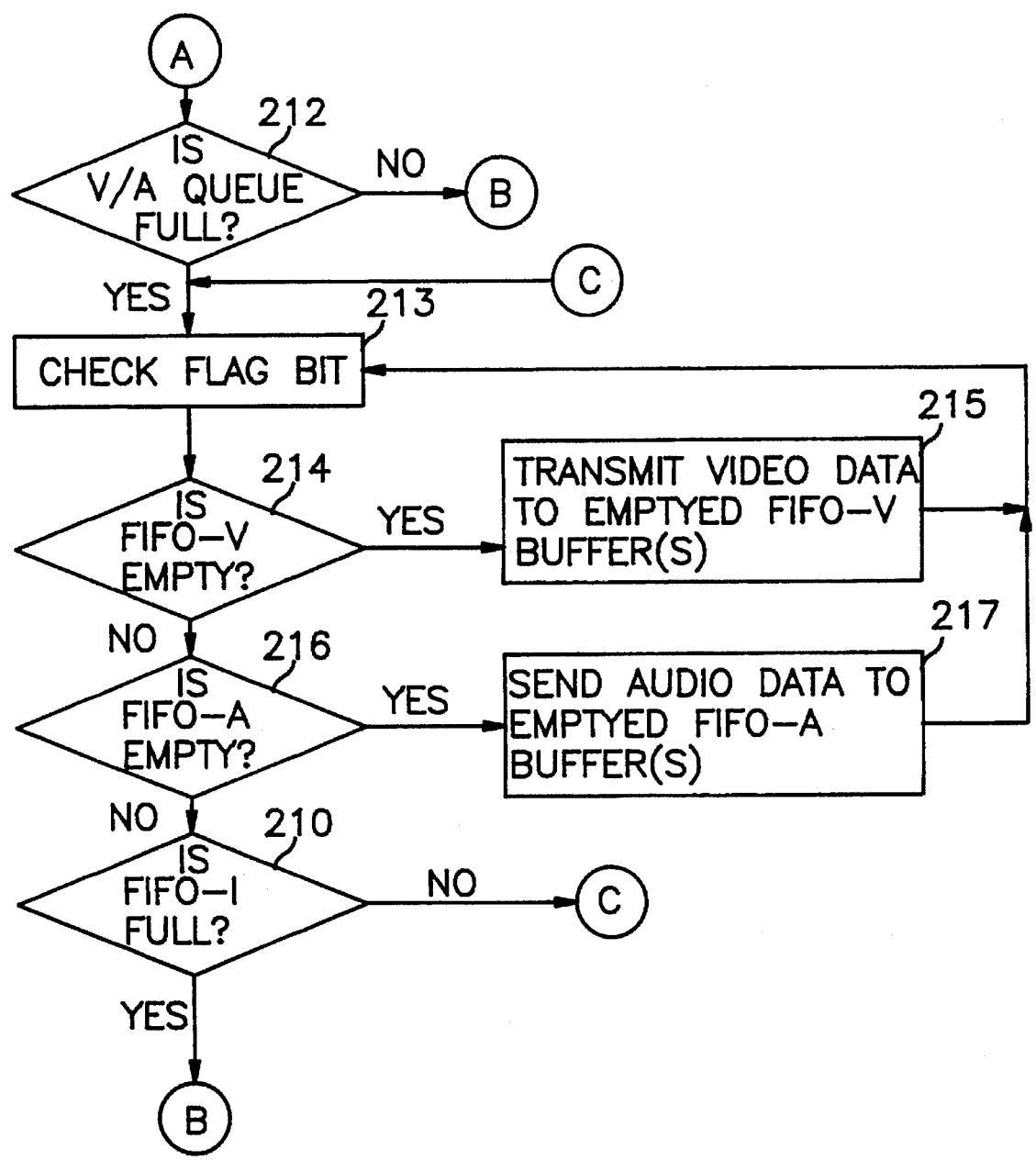

In FIG. 4, the operation begins with a block 201 to check or read the binary code from the flag register 50. In a block 202, first of all, it is determined whether the FIFO-I module 20 has any FIFO-I buffer which exhibits the full buffer state by reading the binary code C0, C1. If the binary code C0, C1 exhibits any particular value other than 00, the bit stream filled in the FIFO-I buffer 22, 24 or 26 which indicates the full state is fetched therefrom. And then, in a block 203, the packet header is extracted from the fetched bit stream so that the fetched bit stream is demultiplexed into the video and the audio bit streams in accordance with the packet header.

In a block 204, if it is determined that the demultiplexed bit stream is the video data stream, the video data stream is sent to the video queue in the RAM 34 as indicated in a block 205 and then the process passes through tab "A" to a block 212.

In a block 206, however, if it is determined that the demultiplexed bit stream is the audio data stream, the audio stream data is transmitted to the audio queue in the RAM 34 as indicated in a block 207 and then the process flows through tab "A" to the block 212.

In a block 208, however, if the demultiplexed bit stream is proved as padding data which is meaninglessly embedded therein, the padding data is abandoned as indicated in a block 209 and then the process goes through tab "A" to the block 212.

In a block 210, if the packet of the bit stream is ended, the transmission is completed as indicated in a block 211. However, if there remains data in the packet to be transmitted, the process returns back to the block 201 in order to recognize the full level of the FIFO-I buffers 22, 24 and 26.

In the block 212, it is determined whether each of the video and audio queues is fully filled with its data stream. If the result of the determination is negative, the process goes back through tab "B" to the block 203. However, if the result of the determination is positive, the process advances to a block 213.

In the block 213, each of the flag code B0, B1 and A0, A1 is checked to determine the storage state of the FIFO-V and the FIFO-A buffer modules 60 and 80.

As a result of the determination, in a block 214, if it is determined that the FIFO-V 60 has any number of the empty FIFO-V buffers 62, 64 and 66 as detected by the binary code B0, B1, the video bit stream stored in the video queue is transmitted to the emptied FIFO-V buffer, as indicated in a block 215.

In a block 216, however, if it is determined that the FIFO-A buffer module 80 has any number of empty FIFO-A buffers 82, 84 and 86 as detected by the binary code A0, A1, the audio bit stream stored in the audio queue is moved to the FIFO-A buffer module 80 to fill up the empty FIFO-A buffer(s) as indicated in a block 217. However, in the blocks 214 and 216, if it is determined that each of the binary codes B0, B1 and A0, A1 represents the full state of the buffer(s), the control process returns to the block 201 in order to repeat the operation as described above.

Although the FIFO-I, the FIFO-V and the FIFO buffer modules are chosen to have three buffers in the illustrated embodiment, respectively, the present invention is not limited thereto. It should be appreciated that the number of the buffers for the buffer modules may be varied depending on the amount of the video and audio data contained in a bit stream.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus for adaptively demultiplexing an input bit stream for use in a decoding system having a decoder for decoding the input bit stream to produce a moving picture and its associated sound, the input bit stream representing a video data bit stream for the moving picture and an audio data bit stream for the sound, which comprises:

an input FIFO (First-In-First-Out) buffer module having a plurality of input FIFO buffer in series for temporarily storing the input bit stream;

a video FIFO buffer module having a plurality of video FIFO buffers in series for temporarily storing the video data bit stream;

an audio FIFO buffer module having a plurality of audio FIFO buffers in series for temporarily storing the audio data bit stream;

means for determining the full or the empty state of each of the input FIFO buffers, the video FIFO buffers and the audio FIFO buffers to thereby produce a buffer status signal indicative of the full or the empty states of the FIFO buffers in the input, the video and the audio FIFO buffer modules;

means, in response to the buffer status signal, for adaptively fetching the input bit stream from the input FIFO buffers that are in the full state; and means for demultiplexing the fetched bit stream to produce the video and the audio data bit streams and providing the video and the audio data bit streams to the video and the audio FIFO buffers that are in the empty state, respectively.

2. The apparatus as recited in claim 1, wherein the dertemining means includes three same set of the detectors for the input FIFO buffer module, the video FIFO buffer module and the audio FIFO buffer module, respectively, each of the detectors further comprising:

a first logic part for detecting the condition that none of the FIFO buffers is in the full or the empty state;

a second logic part for detecting the condition that at least one FIFO buffer is in the full or the empty state;

a third logic part for detecting the condition that all of the FIFO buffers are in the full or the empty state; and an encoder, in response to the resultant outputs from the first, the second and the third logic parts, for generating the buffer status signal.

3. The apparatus as recited in claim 2, wherein the demultiplexing means further includes temporary storage means for respectively storing the video and the audio data bit streams before the video and the audio data bit streams being provided to the video and audio FIFO buffers that are in the empty state, respectively.

* * * * *